(12) United States Patent
Dewey et al.

(10) Patent No.: US 10,798,916 B2
(45) Date of Patent: Oct. 13, 2020

(54) APPARATUS AND METHOD FOR DISPENSING FOOD, MEDICATION AND SUPPLEMENTS FOR ANIMALS

(71) Applicant: The Animal Docs LLC, Aliso Viejo, CA (US)

(72) Inventors: Ashley Miliotti Dewey, Aliso Viejo, CA (US); Maria Brömme, Santa Monica, CA (US); Kitcia Jael Juache Aguilar, Salinas, CA (US); Sandy N. Moreno Anaya, San Jose, CA (US); Chenxi Ji, Irvine, CA (US); Jose A. Ramirez Ruiz, Irvine, CA (US); Hector Hugo Alvarez Toledo, Aliso Viejo, CA (US)

(73) Assignee: THE ANIMAL DOCS LLC, Aliso Viejo, CA (US)

( * ) Notice: Subject to any disclaimer, the term of this patent is extended or adjusted under 35 U.S.C. 154(b) by 475 days.

(21) Appl. No.: 15/623,355

(22) Filed: Jun. 14, 2017

(65) Prior Publication Data
US 2017/0354119 A1    Dec. 14, 2017

Related U.S. Application Data

(60) Provisional application No. 62/349,751, filed on Jun. 14, 2016.

(51) Int. Cl.
*A01K 5/02*    (2006.01)
*A01K 13/00*   (2006.01)
*A01K 7/02*    (2006.01)

(52) U.S. Cl.
CPC ............ *A01K 5/0275* (2013.01); *A01K 7/025* (2013.01); *A01K 7/027* (2013.01); *A01K 13/003* (2013.01)

(58) Field of Classification Search
CPC .... A01K 5/0275; A01K 7/025; A01K 13/003; A01K 7/027; A01K 5/0114; A01K 5/02;
(Continued)

(56) References Cited

U.S. PATENT DOCUMENTS

| 3,638,618 A | 2/1972 | Strother |
| 3,727,584 A | 4/1973 | Permann |

(Continued)

FOREIGN PATENT DOCUMENTS

WO    WO03013232    2/2003

*Primary Examiner* — Trinh T Nguyen
(74) *Attorney, Agent, or Firm* — Cislo & Thomas, LLP (57) ABSTRACT

An animal feeder comprising a housing, at least one food receptacle coupled to the housing, configured to receive and store food and comprising an inlet opening for receiving food and an outlet opening for releasing food, at least one supplement receptacle coupled to the housing, configured to receive and store at least one supplement, a food dispensing mechanism coupled to the at least one food receptacle, configured to dispense food, a supplement dispensing mechanism coupled to the at least one supplement receptacle and configured to dispense supplement from the at least one supplement receptacle, a control system coupled to the housing and connected to the food and supplement dispensing mechanisms, the control system configured to control the food and supplement dispensing mechanisms so that a desired amount of food and supplement are dispensed, and a power source coupled to the control system and the food and supplement dispensing mechanisms.

14 Claims, 9 Drawing Sheets

(58) Field of Classification Search
CPC ...... A01K 5/0233; A01K 7/02; A01K 5/0291; A01K 5/0216
See application file for complete search history.

(56) References Cited

U.S. PATENT DOCUMENTS

| | | | |
|---|---|---|---|
| 4,079,699 A | | 3/1978 | Longmore et al. |
| 4,422,409 A | | 12/1983 | Walker et al. |
| 4,665,862 A | * | 5/1987 | Pitchford, Jr. ........ A01K 5/0275 119/51.11 |
| 4,815,042 A | * | 3/1989 | Pratt .................... A01K 5/0216 141/104 |
| 4,947,796 A | | 8/1990 | Robinette |
| 5,201,279 A | | 4/1993 | Impastato et al. |
| 6,145,472 A | | 11/2000 | Vittuari et al. |
| 6,379,727 B1 | | 4/2002 | Addy |
| 7,152,550 B2 | | 12/2006 | Walker |
| 8,511,519 B2 | | 8/2013 | Mahle et al. |
| 9,192,142 B2 | | 11/2015 | Jackson et al. |
| 9,295,271 B2 | | 3/2016 | Rothamel |
| 2005/0217591 A1 | * | 10/2005 | Turner ................. A01K 5/0114 119/51.02 |
| 2009/0173282 A1 | * | 7/2009 | Wu ..................... A01K 5/0114 119/51.02 |
| 2010/0239708 A1 | * | 9/2010 | Bachman ................ A01K 5/00 426/2 |
| 2012/0125263 A1 | | 5/2012 | Northrop et al. |

\* cited by examiner

APPARATUS AND METHOD FOR DISPENSING FOOD, MEDICATION AND SUPPLEMENTS FOR ANIMALS

CROSS-REFERENCE TO RELATED APPLICATIONS

The present Application claims the benefit of U.S. Provisional Patent Application No. 62/349,751 titled "Pet Barista," filed Jun. 14, 2016, the contents of which are incorporated herein by reference in their entirety.

BACKROUND

The health of domestic dogs and cats depends in part on their diet and access to veterinary care. As veterinary care for pets continues to advance, more responsibility is put on pet owners to comply in giving their pets the best possible standard of care. With increasingly busy lifestyles, it can be difficult for pet owners to commit to all veterinary advice, such as remembering to give monthly flea and heartworm prevention, adding vital supplements to each meal, and preparing nutritious diets. Many members of the senior pet population are also on chronic medications that must be administered on a daily basis to ensure efficacy.

Along with increasing access to advanced veterinary care, more and more pet owners are feeding their pet's high-quality, human-grade food products. Many of these products come in the form of dehydrated or freeze-dried diets, which are time-consuming to prepare. Owners are instructed to heat water, and then mix the food with the water. There are various ways to heat water, including in the microwave, using a kettle, or heating water on the stove. None of these methods result in an accurate prediction of water temperature and it is therefore possible to expose pets to thermal burns if water is not adequately cooled prior to the pet consuming the meal. If the water is not heated to a high enough temperature, it can take longer for the food to rehydrate and it may not be as palatable to the pet.

It is also important to maintain the correct ratio of food to water in order to result in optimal rehydration results. The exact amount of heated water must be measured, which can pose a risk for the pet owner when pouring hot water into a measuring cup. The water must then be poured into the bowl with the correct amount of dog food, which again can put the pet owner at risk for thermal burns. This task would also likely be reserved for adult pet owners, with children unable to participate in the feeding of their pet.

Besides preparing rehydrated meals, many pet owners are also adding supplements to their pet's diets such as omega-3 fatty acids, glucosamine and chondroitin, and probiotics. Adding supplements to each meal can be a challenge to remember, in addition to being time-consuming and messy. Pet supplements can also be obtained from a variety of retailers, not all of which are standardized and therefore accurate dosing can be difficult to achieve. Additionally, many supplements begin to break down and oxidize once the container is opened and exposed to air. This can result in pet owners unknowingly providing inadequate supplements to their pets.

Moreover, many dogs and cats require monthly parasite preventatives (including but not limited to flea, tick, heartworm and intestinal parasite preventatives). Poor compliance of monthly parasite prevention can result in flea infestations, devastating heartworm infections, the transmission of tick-borne diseases, and zoonotic intestinal parasite infections. These diseases can pose a great threat to adults and children, therefore monthly administration of these antiparasitics is highly recommended. It is the pet owner's responsibility to remember when to administer these important medications.

Accordingly there is a need for an improved apparatus and method for properly dispensing food, medication, and supplements to animals.

SUMMARY

The present invention is directed to an animal feeder comprising: a) a housing; b) at least one food receptacle coupled to the housing and configured to receive and store food, the food receptacle comprising an inlet opening for receiving food and an outlet opening for releasing food; c) at least one water reservoir coupled to the housing and configured to receive and store water; d) at least one supplement receptacle coupled to the housing and configured to receive and store at least one supplement; e) at least one medication receptacle coupled to the housing and configured to receive and store at least one medication; f) a food dispensing mechanism coupled to the at least one food receptacle and configured to dispense food from the at least one food receptacle; g) a water dispensing mechanism coupled to the at least one water reservoir and configured to dispense water from the at least one water reservoir; h) a supplement dispensing mechanism coupled to the at least one supplement receptacle and configured to dispense supplement from the at least one supplement receptacle; i) a medication dispensing mechanism coupled to the at least one medication receptacle and configured to dispense medication from the at least one medication receptacle; and j) a control system mounted in the housing and coupled to the food, water, supplement, and medication dispensing mechanisms, the control system configured to control the food, water, supplement and medication dispensing mechanisms so that a desired amount of food, water, supplement and medication are dispensed.

In a second embodiment, the animal feeder comprising: a) a housing comprising a base, the base comprising a platform for placement of a food dish; b) at least one food receptacle coupled to the housing and configured to receive and store food, the food receptacle comprising an inlet opening for receiving food and an outlet opening for releasing food; c) at least one supplement receptacle coupled to the housing and configured to receive and store at least one supplement; d) a food dispensing mechanism coupled to the at least one food receptacle and configured to dispense food from the at least one food receptacle; e) a supplement dispensing mechanism coupled to the at least one supplement receptacle and configured to dispense supplement from the at least one supplement receptacle; f) a control system coupled to the housing and connected to the food and supplement dispensing mechanisms, the control system configured to control the food and supplement dispensing mechanisms so that a desired amount of food and supplement are dispensed; and g) a power source coupled to the control system and the food and supplement dispensing mechanisms.

The animal feeder can further comprise h) at least one water reservoir coupled to the housing and configured to receive and store water; and i) a water dispensing mechanism coupled to the at least one water reservoir and configured to dispense water from the at least one water reservoir.

Optionally, the animal feeder can further comprise h) at least one medication receptacle coupled to the housing and configured to receive and store at least one medication; and i) a medication dispensing mechanism coupled to the at least one medication receptacle and configured to dispense medication from the at least one medication receptacle.

The animal feeder can further comprise a power source and a water heater for heating water contained in the water reservoir to an appropriate temperature for dispensing onto dispensed food.

Optionally, the animal feeder further comprises one or more air tight cartridges each containing one or more supplements, wherein the cartridges are configured such that ambient air is not able to contact the supplement contained in the cartridge, preventing the supplement from oxidizing and deteriorating.

The supplement dispensing mechanism can comprise an air pump coupled to the at least one supplement receptacle configured to expel supplement contained in the at least one supplement receptacle or the one or more cartridges at a measured rate.

The control system can comprise a digital display coupled to the housing configured to permit a user to create one or more pet profiles assigned to one or more individual pets, each pet profile comprising the desired amount of food, water, supplement and medication to be dispensed when the pet profile is selected by the user.

A method of using an animal feeder comprises the steps of a) providing the animal feeder of the claimed invention; b) creating one or more pet profiles assigned to one or more individual pets; c) placing an empty food dish on the platform; d) selecting the desired pet profile on the digital display; and e) dispensing a proper amount of food and supplement into the empty pet food bowl.

Once the pet profiles have been created, a method of using an animal feeder, comprises the steps of: a) providing the animal feeder of the claimed invention; b) placing an empty food dish on the platform; c) selecting the desired pet profile on the digital display; and d) dispensing a proper amount of food, water and supplement into the empty pet food bowl.

In a third embodiment, the animal feeder comprises: a) a housing; b) at least one food receptacle coupled to the housing and configured to receive and store food, the food receptacle comprising an inlet opening for receiving food and an outlet opening for releasing food; c) at least one medication receptacle coupled to the housing and configured to receive and store at least one medication; d) a food dispensing mechanism coupled to the at least one food receptacle and configured to dispense food from the at least one food receptacle; e) a medication dispensing mechanism coupled to the at least one medication receptacle and configured to dispense medication from the at least one medication receptacle; and f) a control system mounted in the housing and coupled to the food and medication dispensing mechanisms, the control system configured to control the food and medication dispensing mechanisms so that a desired amount of food and supplement are dispensed.

The animal feeder can further comprise: g) at least one water reservoir coupled to the housing and configured to receive and store water; and h) a water dispensing mechanism coupled to the at least one water reservoir and configured to dispense water from the at least one water reservoir.

The animal feeder can further comprise: g) at least one supplement receptacle coupled to the housing and configured to receive and store at least one supplement; and h) a supplement dispensing mechanism coupled to the at least one supplement receptacle and configured to dispense supplement from the at least one supplement receptacle.

Optionally, the animal feeder can further comprise a power source and the control system comprises a digital display coupled to the housing configured to permit a user to create one or more pet profiles assigned to one or more individual pets, each pet profile comprising the desired amount of food and medication to be dispensed when the pet profile is selected by the user.

DRAWINGS

These and other features, aspects, and advantages of the present invention will become better understood with reference to the following description, appended claims, and accompanying drawings where:

DESCRIPTION

As used herein, the following terms and variations thereof have the meanings given below, unless a different meaning is clearly intended by the contest in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

As used in this disclosure, the term "supplements" and variations of the term, such as "additive," are to be construed to cover omega-3's (fish oils), glucosamine and chondroitin, pro-biotics, lysine, liver supplements, dental enzymes, etc. in liquid or cream form and that can be delivered orally.

As used in this disclosure, the term "medication" and similar referents used herein are to be construed to cover flea, tick, and intestinal worm and heartworm preventatives. Additionally, the apparatus can also provide daily (SID, BID, TID, or QID) medication reminders if desired (such as insulin, NSAID's, thyroid medication, pain medications, incontinence medications, etc. Medications must be available in liquid/cream form and delivered orally. The list for medications would be very long—this is something that owners can program into the computer themselves so that they never forget a daily medication.

Figure 9:
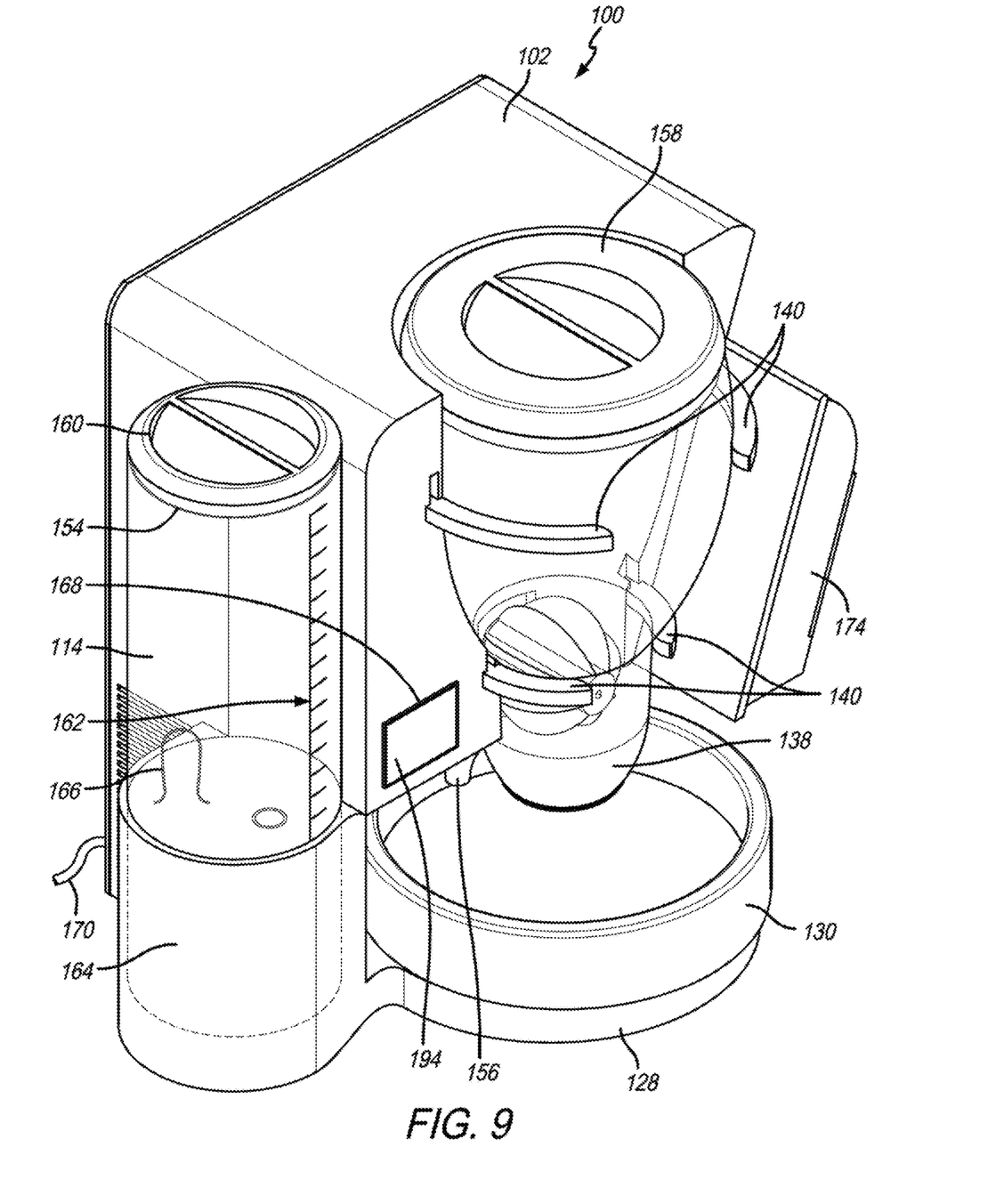
FIG. 9 is a perspective view of an alternative embodiment of an animal feeder, wherein the animal feeder comprises a water reservoir.

Referring now to FIG. 1-6, there is shown an apparatus 100 for preparing animal food. The animal food can be freeze-dried, dehydrated, or dry pet food. The apparatus 100 comprises a housing 102, at least one food receptacle 104, at least one supplement receptacle 106, a food dispensing mechanism 108, a supplement dispensing mechanism 110, and a control system 112. Optionally, as shown in FIG. 9, the apparatus 100 can further comprise at least one water reservoir 114 and a water dispensing mechanism 116. Additionally, the apparatus 100 can also comprise at least one medicine receptacle 118 and a medicine dispensing mechanism 120.

Figure 3:
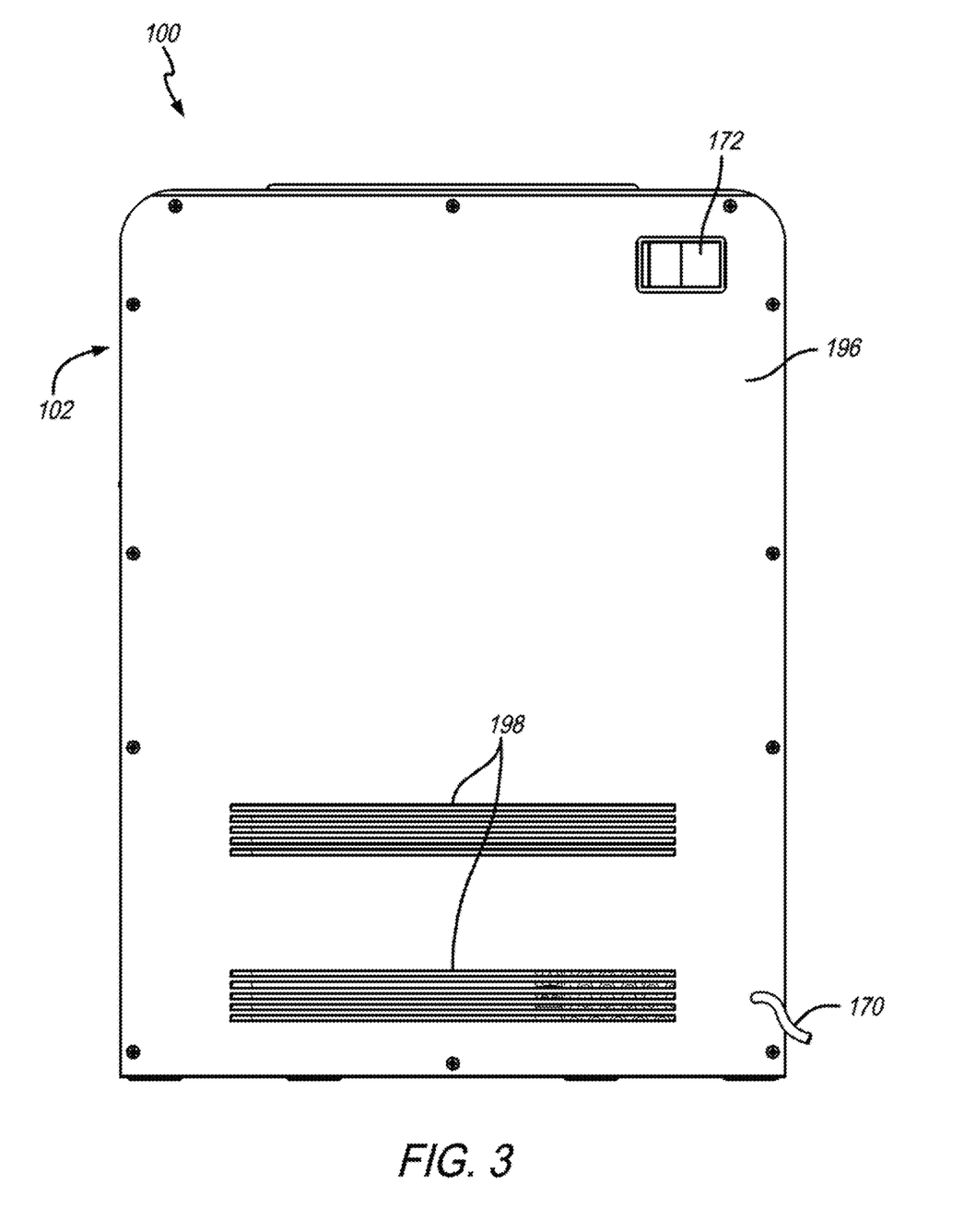
FIG. 3 is a rear elevation view of the animal feeder of FIG. 1.
Figure 4:
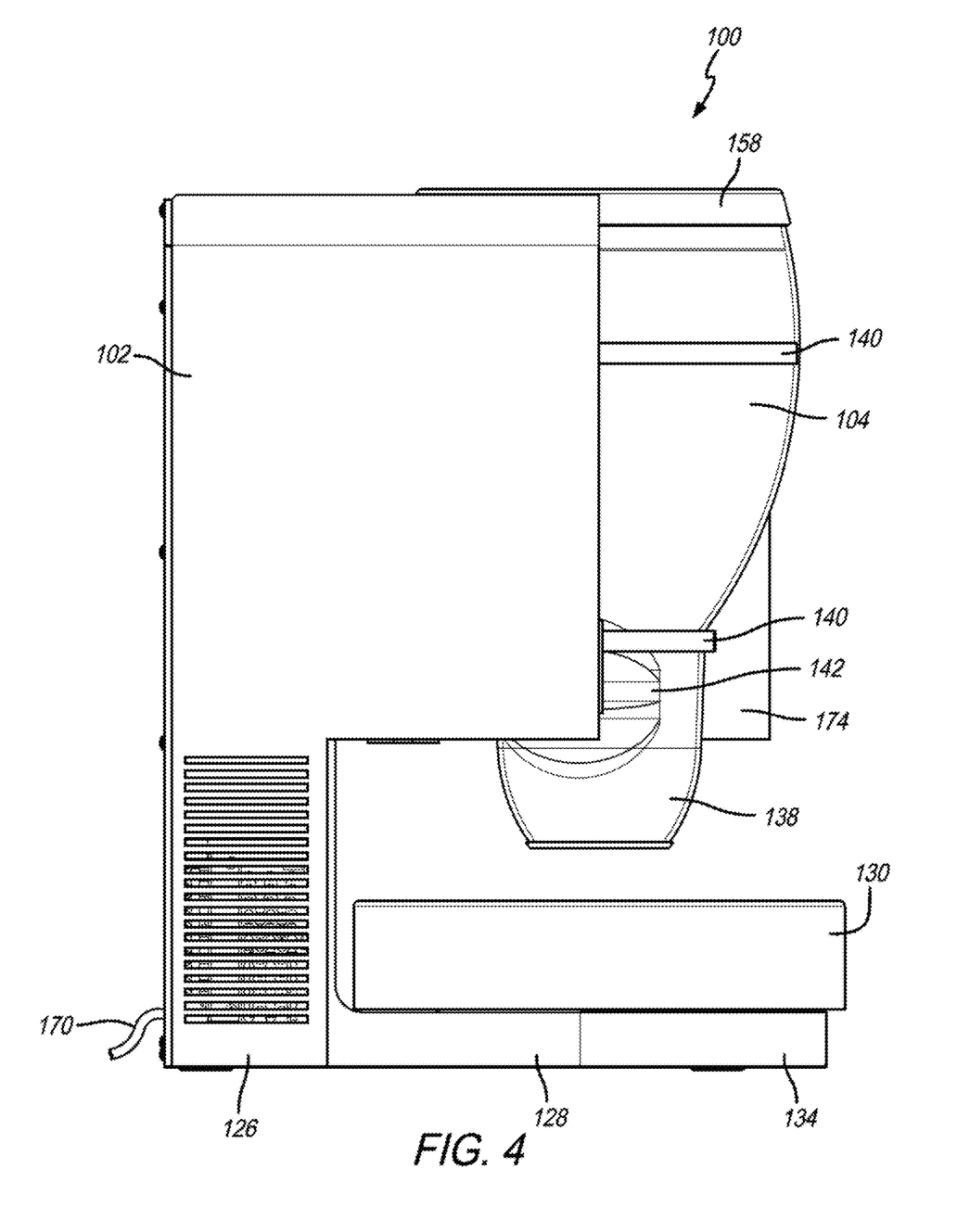
FIG. 4 is a left side elevation view of the animal feeder of FIG. 1.
Figure 5:
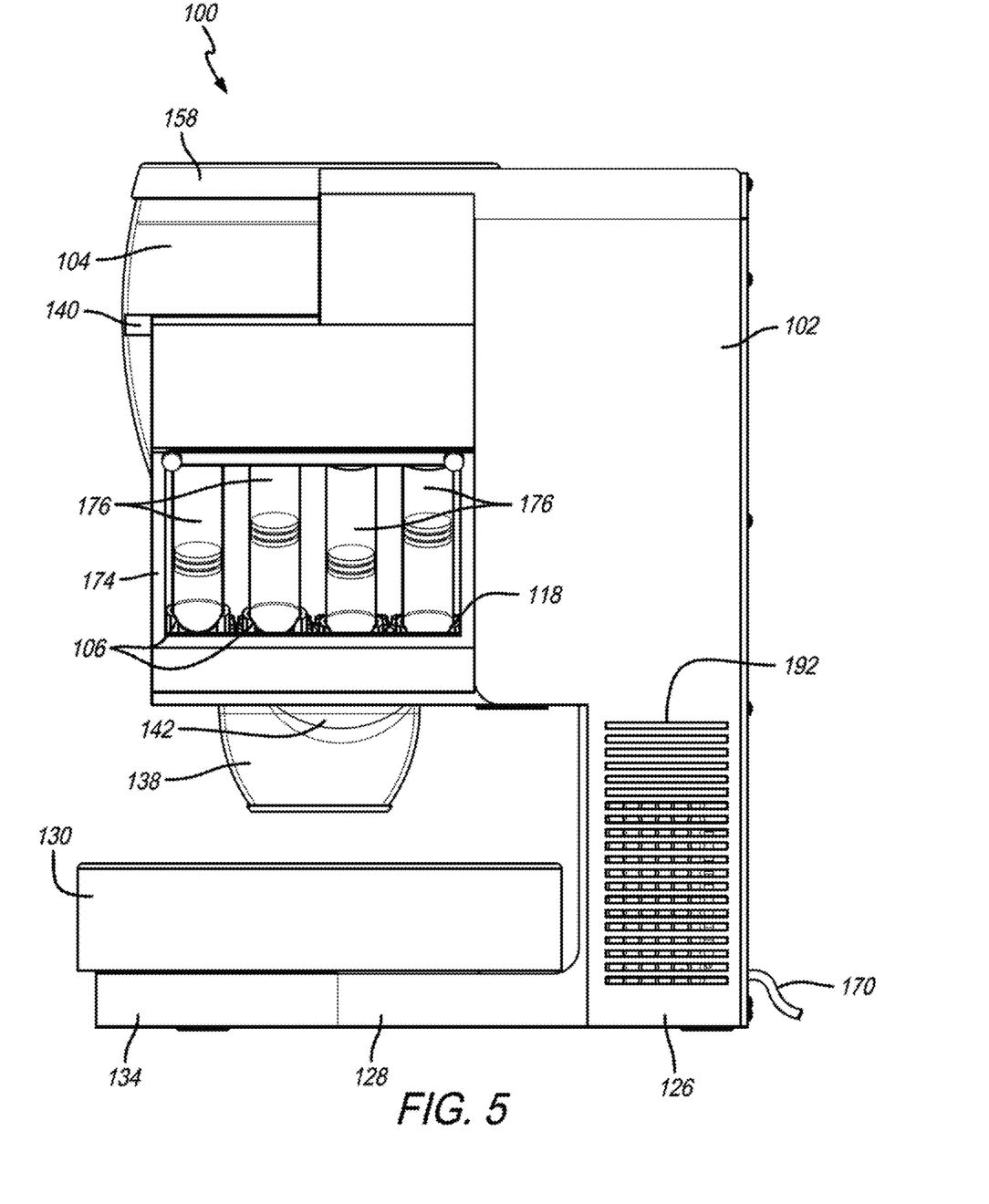
FIG. 5 is a right side elevation view of the animal feeder of FIG. 1.
Figure 6:
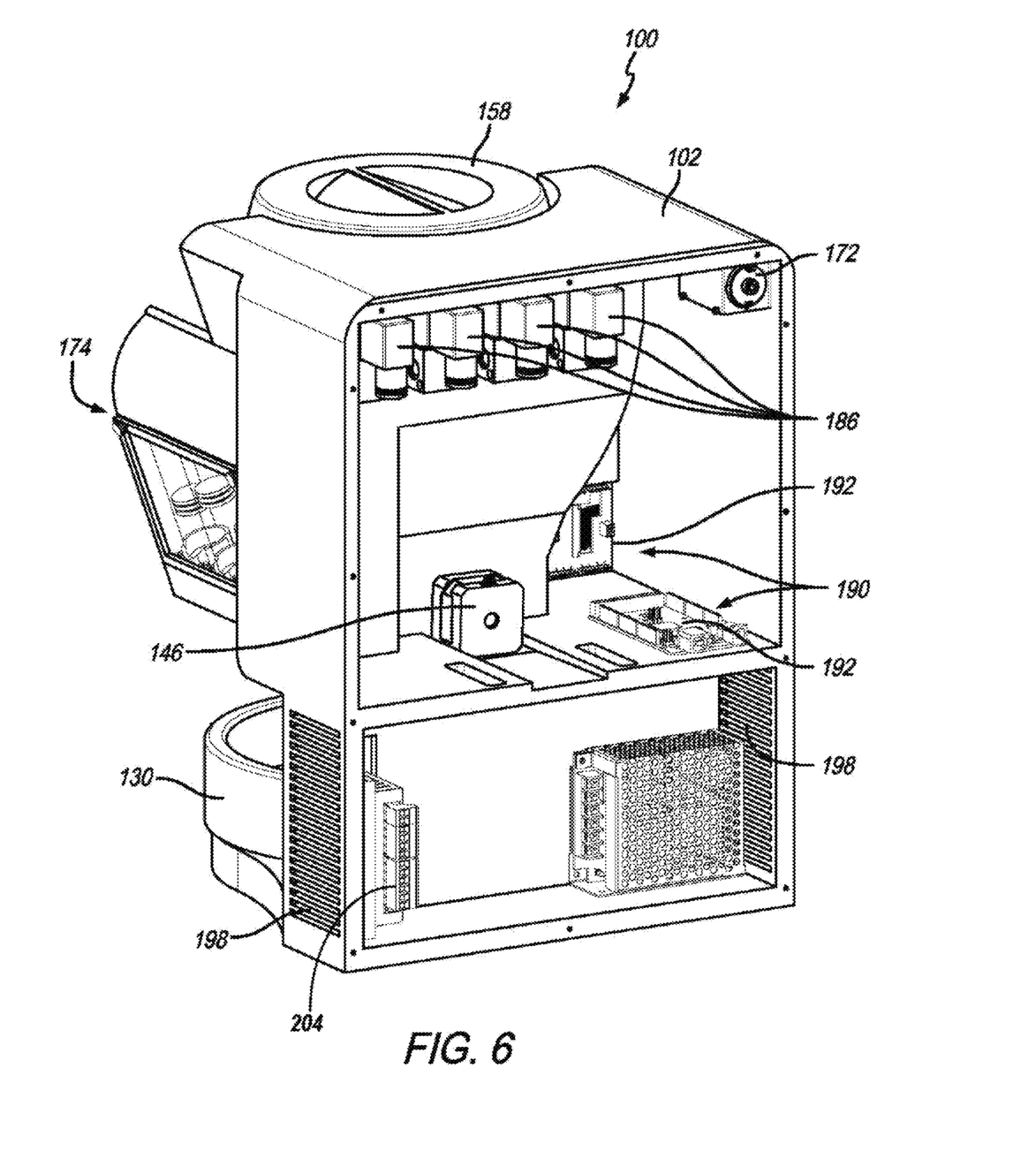
FIG. 6 is a perspective view of the rear of the animal feeder of FIG. 1, wherein the rear wall has been removed to show the internal components.

The housing 102 comprises an exterior surface 122, an interior compartment 124 and a base 126. As can be seen in FIG. 3 and FIG. 6, the housing 102 has a removable back wall 196 so that the interior compartment 124 can be accessed if necessary. The housing 102 also has at least one vent 198 for allowing hot air to escape the interior compartment 124. The housing 102 can be made from any material, but preferably is made from a lightweight plastic so that the apparatus 100 is not unduly heavy. Typical dimensions of the housing 102 are 16 inches tall, 12 inches wide and 12 inches long, but it should be noted that the dimensions can be scaled up or down, as necessary.

Figure 1:
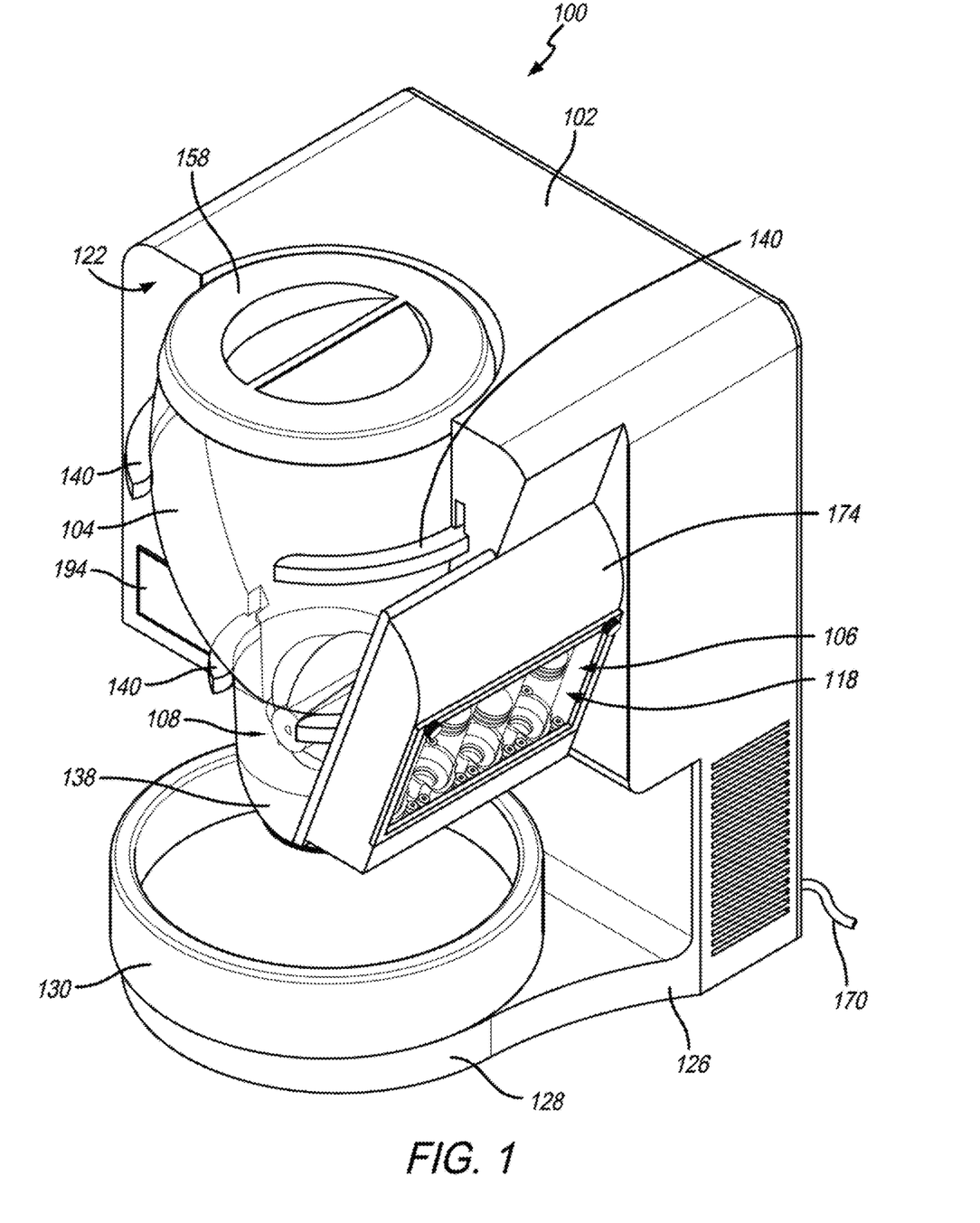
FIG. 1 is a perspective view of an animal feeder having features of the present invention.
Figure 2:
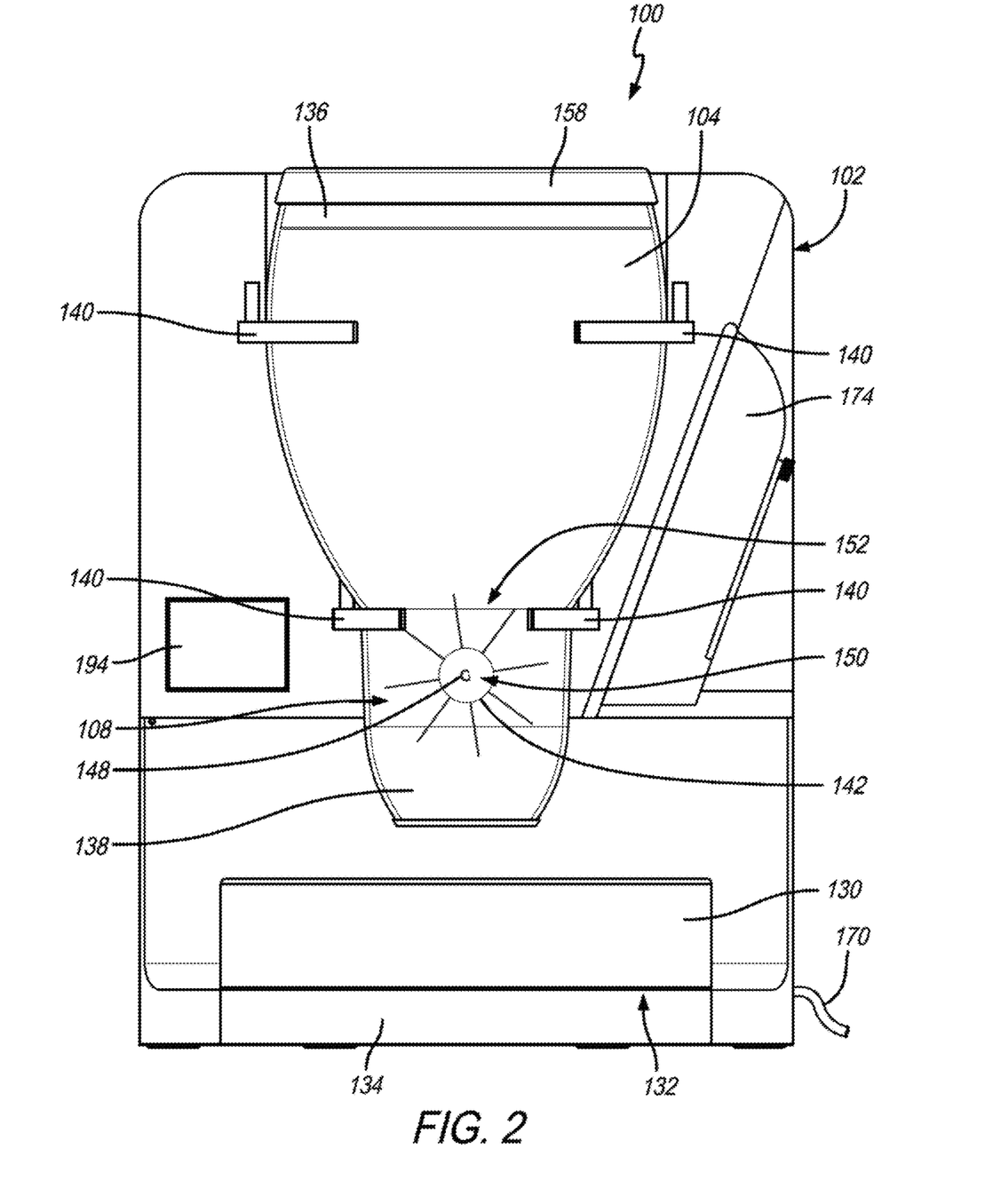
FIG. 2 is a front elevation view of the animal feeder of FIG. 1.

Optionally the base 126 comprises a platform 128 for supporting an animal food dish 130. As shown in FIG. 2, there is a drip gate 132 in the platform 128 of the apparatus 100 with lattice bars which allow spillage of water and food dispensed from the food and water 108, 116 dispensing mechanisms flow through the drip gate 132 and into a spillage reservoir 134 located below. The drip gate 132 is removable to allow easy cleaning of the spillage reservoir 134.

Optionally, the base 126 and platform 128 comprise a vibrator to vibrate the platform 128 that the food dish 130 is resting on, mixing the dispensed food, water and other additives.

Optionally, the base 126 and platform 128 comprises a scale to weigh the food dish 130 and its contents, in order to ensure the proper amount of food, water, and additives is dispensed.

The at least one food receptacle 104 is coupled to the housing 102 and configured to receive and store food. The food receptacle 104 is removable from the housing 102 for easy cleaning, and has an inlet opening 136 for receiving food and an outlet opening 138 for releasing food. The food receptacle 104 can be any shape, but preferably, the food receptacle 104 comprises an undulating U-shape as shown in the FIGS., and this shape is what holds the food receptacle 104 in place in the housing 102. Optionally, the housing 102 has at least one arm 140 that extends from the exterior surface 122 of the housing 102 and partially encircle the food receptacle 104. Preferably, as shown in the figures, there are four arms 140. The arms 140 assist in securing the food receptacle 104 to the housing 102 and can be made from plastic or rubber. The arms 140 move from an open position for removal of the food receptacle 104, to a closed position for securing and preventing removal of the food receptacle 104. Preferably, the food receptacle 104 holds a minimum of five (5) pounds of food. The food receptacle 104 can also have a removable lid 158.

The food dispensing mechanism 108 is coupled to the food receptacle 104. The food dispensing mechanism 108 can be in many forms, including but not limited to a worm drive, a trap door, and a rotating cup that dumps the appropriate amount of food. As best shown in FIG. 2, the food dispensing mechanism 108 comprises a star ball 142 coupled to a stepper motor 146. The star ball 142 has a cavity in its center. The shaft of the stepper motor 146 extends out through the front of the housing 102, and is attached by a coupling to a pin 148 that goes inside the cavity in the center of the star ball 142. Optionally the pin 148 may be plastic, and the plastic pin 148 has a planar surface 150 that matches a planar surface in the cavity of the star ball 142. The marrying of the two planar surfaces it what allows the pin 148 to remain in place in the star ball 142. Once the motor 146 rotates, it then rotates the star ball 142. The star ball 142 is divided into 6 wedges 152. When the motor 146 rotates 60 degrees, the star ball 142 dispenses the contents of one wedge 152, which is equivalent to 1 ounce. A motor driver 204 is located inside the interior compartment 124 and drives the motor 146.

Referring now to FIG. 9, the at least one water reservoir 114 is coupled to the housing 102 and configured to receive and store water. Optionally the water reservoir 114 is disposed inside the housing 102. The water reservoir 114 has an inlet opening 154 for receiving water and an outlet opening 156 for dispensing water. Preferably, the water reservoir 114 holds 24 fluid ounces or more of water, sufficient for at least two (2) large breed dog feedings or four (4) small breed dog or cat feedings. The capacity of the water reservoir 114 may be larger or smaller. The water reservoir 114 releases to flow directly into the pets dish 130 to moisten the food contained therein.

Optionally, the water reservoir 114 has a lid 160 that covers the inlet opening 154. The water reservoir lid 160 is easily removed for easy pouring of additional water into the water reservoir 114. A user may use tap water. Preferably the water reservoir 114 has a clear front surface to allow visual inspection of the water level, and has graduation marks 162 so that the user can accurately see how much water is left.

Optionally the water reservoir 114 can include a heater 164 for heating water contained in the water reservoir 114. One or more heating elements 166 can extend through the floor of the water reservoir 114 to heat contained water evenly and consistently. The heating element 166 permits heating of a smaller amount of water more efficiently and quickly. Preferably, the temperature of the water should be normal body temperature, about 98.6° Fahrenheit. This prevents the animal from being harmed by consuming food heated to too high a temperature. A temperature display 168 is provided to ensure pet owners that the temperature is accurate Power to the apparatus 100 is delivered with a 120 volt AC current through a power cord 170. As best seen in FIG. 3, an on/off switch 172 turns power on and off to the apparatus 100, and therefore all its internal components such as the heater 164. The switch 172 can be located anywhere on the apparatus 100. The location shown in FIG. 3 is not limiting.

Figures 7, 8:
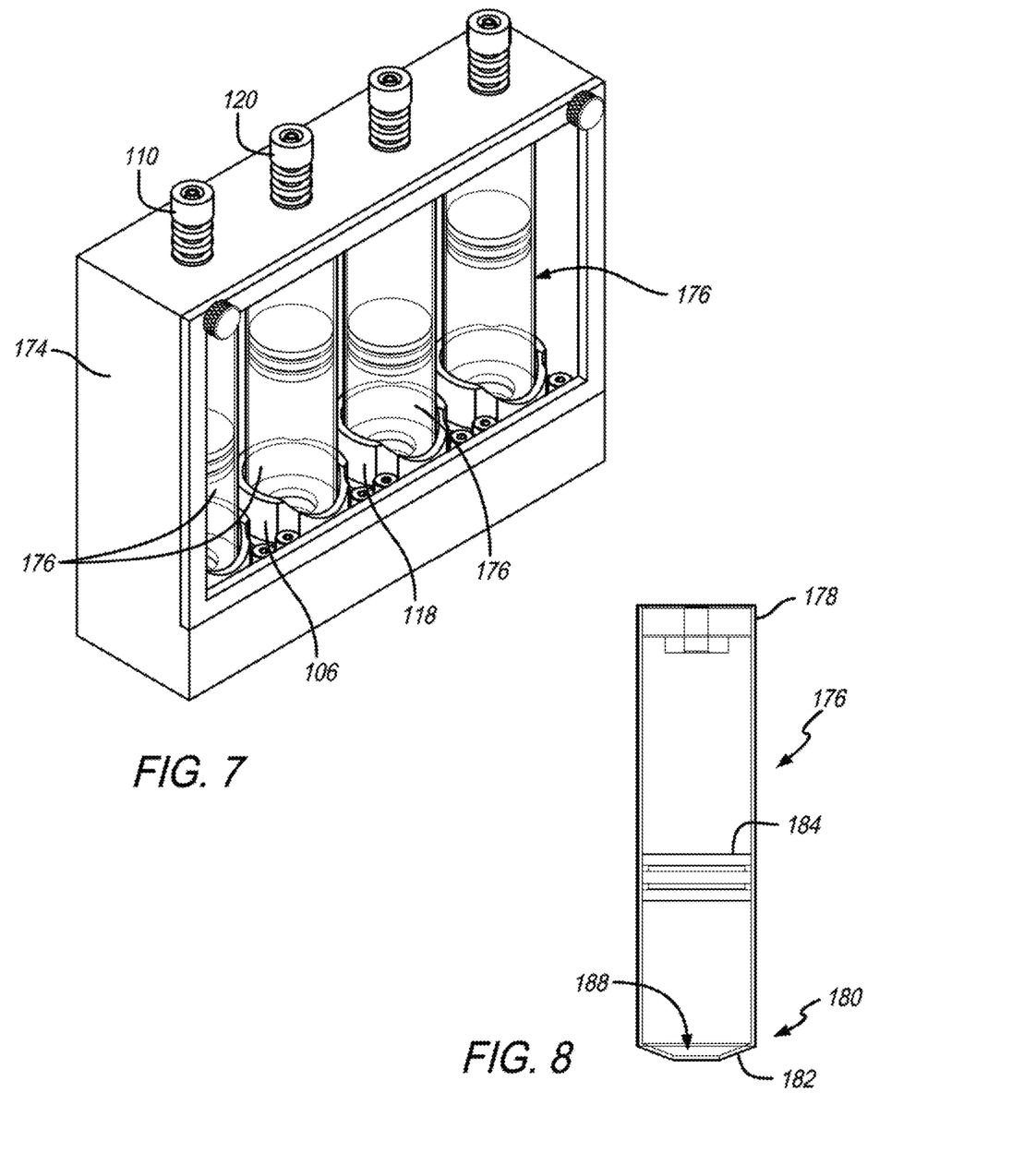
FIG. 7 is a perspective view of the supplement cartridges loaded into the additive dispenser, utilized in the animal feeder of FIG. 1.
FIG. 8 is a front elevation view of the supplement cartridge of FIG. 7, wherein it has been removed from the additive dispenser.

Referring now to FIGS. 7 and 8, in order to cleanly and efficiently dispense additives (supplements and medicine) onto the dispensed pet food in the pet dish 130, an additive dispenser 174 is provided. The additive dispenser 174 is coupled to the housing 102 and has at least one supplement receptacle 106 and optionally, at least one medicine receptacle 118. The at least one supplement receptacle 106 is disposed inside the additive dispenser 174 and is configured to receive and store at least one supplement. The supplement can be loaded directly into the supplement receptacles 106. However, if the supplement is liquid, this can get quite messy.

Preferably, liquid supplements (and optionally medicine as well) are stored in separate air-tight cartridges 176 that can be positioned in one of the supplement or medicine receptacles 106, 118. Each cartridge 176 has a top 178 and a bottom 180 comprising a nozzle 182. There is a first aluminum (or similar material) easy-peal seal on the top of the cartridge and a second aluminum (or similar material) easy-peal seal on the nozzle of the cartridge 176. Both seals remain in place until the cartridge 176 is ready to use. Once the cartridge 176 is ready to be set into the supplement or medicine receptacles 106, 118, both seals will be removed by the user. Additionally, to ensure freshness the cartridges 176 can each include a plastic cap that will also be removed prior to its insertion into the supplement or medicine receptacle 106, 118.

Additionally, each cartridge 176 is designed with a rubber piston 184 inside that divides the supplement from the air that is pumped in utilizing an air pump 186 and a solenoid valve (each air pump 186 and valve comprises the supplement or medication dispensing mechanism 110, 120). As best seen in FIG. 6, each receptacle 106, 118 (and therefore cartridge 176) has its own air pump 186, thus, there are four air pumps 186 shown in FIG. 6. The air flow is controlled utilizing the solenoid valve, which allows for air to go from the air pump 186 into the cartridge 176 through silicon hoses or exhaust the excess air when necessary to relieve pressure. The hoses connect to the air pumps 186 to the supplement and medicine dispensing mechanisms 110, 120. When the solenoid valve allows a small amount of air in, there is a commensurate amount of force applied to the rubber piston 184 inside the cartridge 176. Essentially, the volume of liquid (supplement or medicine) is replaced by volume of air, causing the cartridge 176 to release its contents through a one way silicone valve (membrane) 188 at the nozzle 182 of the cartridge 176. This one-way valve 188 only allows the contents of the cartridges 176 to go out in one direction, as described above. The silicon valve 188 is open when pressure is applied to the cartridge 176 in the form of air pumped in. Each cartridge 176 is designed to be discarded after its contents are completely expelled, requiring ultimately no clean-up. The mechanism of dissension together with the rubber piston 184 inside each cartridge 176 ensures its contents remain in an air tight environment through the entire dispensing process preventing oxidation of its components.

Figure 10:
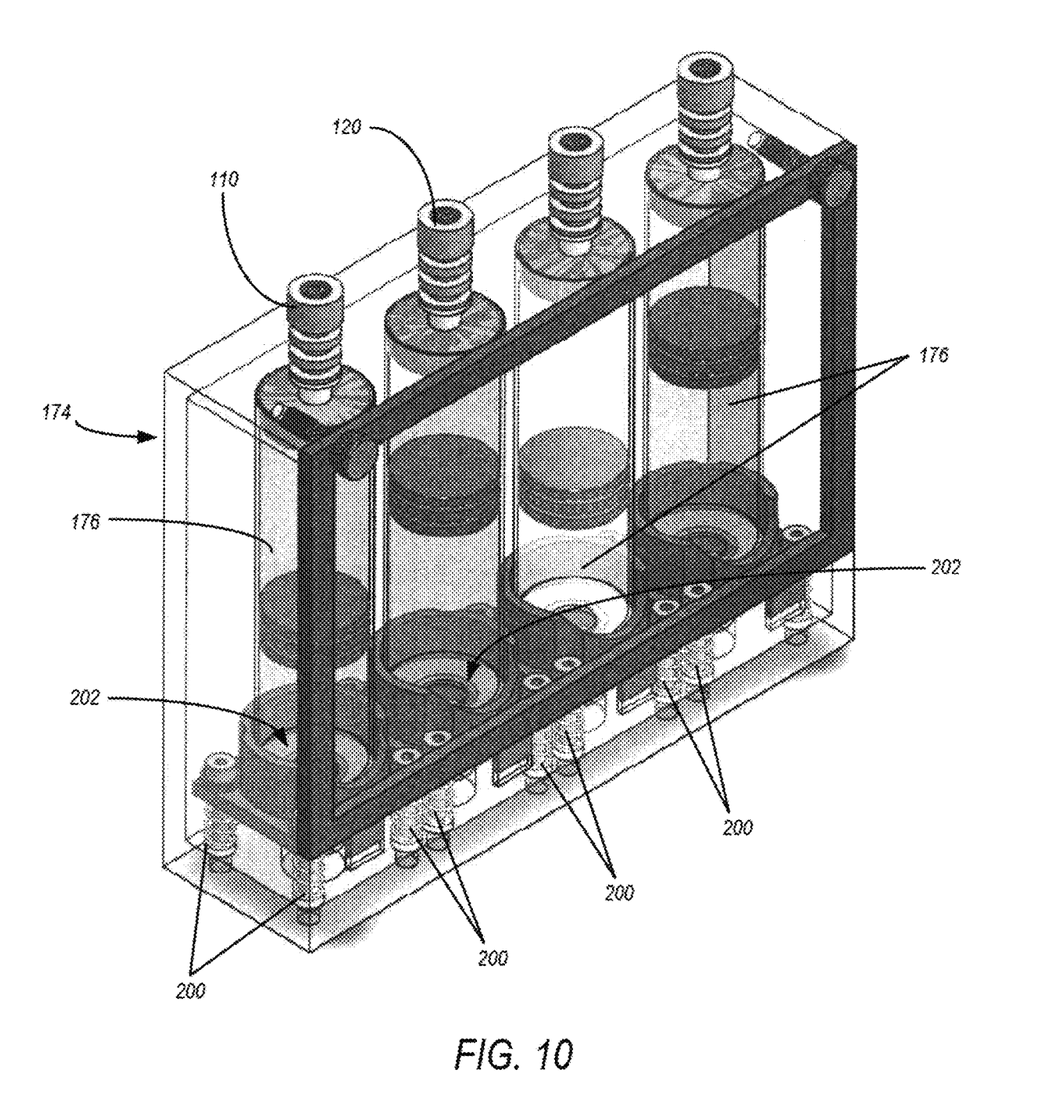
FIG. 10 is a perspective view of the additive dispenser shown in FIG. 7, wherein spring loaded mechanisms can be viewed.

As best seen in FIG. 10, the cartridges 176 are loaded and retained inside the supplement and medicine receptacles 106, 118 using a spring-loaded mechanism 200. Individual plates 202 hold each cartridge 176 in its corresponding receptacle 106, 118. The spring loaded mechanism 200 allows the user to push down on the individual plates 202, and once the corresponding spring 200 is no longer under pressure, the cartridge 176 is then pushed back up. The cartridge 176 is locked in placed and in contact with a connector (supplement or medicine dispensing mechanism 110, 120) that leads to the air pumps 186.

The control system 190 comprises one or more computers 192 mounted in the housing and coupled to the food, water, supplement, and medication dispensing mechanisms 108, 116, 110, 120. The control system is configured to control the food, water, supplement and medication dispensing mechanisms 108, 116, 110, 120 so that the desired amount of food, water, supplement and medication are dispensed.

Optionally, the control system 190 comprises a digital or touch screen display 194 located on the housing 102 that communicates with the computers 192 to allow the user to program their pets information (i.e., pets breed, age, ideal weight, medical issues, type of food, supplements, medications etc.). The user inputs the feeding amount and desired supplements and/or medications for multiple pets, creating a unique pet profile for each pet. Optionally, the computer 192 determines/calculates the desired pet's dietary requirements. Once programmed, the computer 192 actuates the food, water, supplement and medication dispensing mechanisms 108, 116, 110 120 to dispense a precise amount of food, water, supplements and/or medication based on the selected pets pre-programmed dietary needs for optimal health. The user also has the option to manually dispense a selected amount of food, water, supplements or medication. Furthermore, the user can choose to have the apparatus 100 dispense only food, only water, only supplements, only medication, or a mixture thereof based on pre-programmed or manually entered information. The display 194 is also used to notify the owner of their pet's basic health reminders and to remind pet owners when monthly medications (such as flea and heartworm preventatives) are due for a given pet.

Optionally, the computer 192 can connect to and sync with a user's smart phone or remote mobile device via Wi-Fi or Bluetooth and optionally utilize an app. The app can be used to facilitate integrated veterinary care if the veterinarian also has access to the information, and to remind pet owners when monthly medications (such as flea and heartworm preventatives) are due for a given pet.

The present invention overcomes the various time-consuming methods of preparing pet food from freeze-dried or dehydrated pet food products, including adding supplements and remembering monthly (or daily) pet medications. The apparatus 100 provides a comprehensive system and method for integrating food preparation, supplement additions and basic pet health reminders.

Before a user is ready to feed one or more pets, the user first fills the water reservoir 114 and heats the water in the water reservoir 114 with the heating element 166 to a predetermined set point within a predetermined range of temperatures, and the control system 190 maintains the temperature of the water at the set point for an extended period until ready for use. Additionally, a user can also pre-fill the additives dispenser 174 with cartridges 176 containing supplements and medicine. Optionally, the food receptacle 104 can be pre-filled as well.

When a user is ready to feed one or more pets, the method of using comprises filling the food receptacle 104 with pet food (if not already pre-filled); using the display 194 to create and store multiple animal's diet related needs (with the capacity for medical integrations) as individual pet profiles; placing an empty food dish 130 on the platform 128; selecting the desired pet profile, and dispensing a proper amount of food and supplement into the empty food dish 130.

If the apparatus 100 comprises a vibrator, the vibration created by the vibrator can mix the contents of the food dish 130. Otherwise, a user is free to manually mix the contents.

Once the individual pet profiles have been created, and user desired to feed a pet, they simply place an empty food dish 130 on the platform 128; select the desired pet profile on the digital display 194; and the proper amount of food, water, supplement and/or medicine is dispensed into the empty food dish 130.

Although the invention has been described in terms of a preferred embodiment, nevertheless, changes and modifications can be made which do not depart from the spirit, scope and teachings of the invention. Such changes and modifications are deemed to fall within the purview of the present invention as claimed.

What is claimed is:

1. An animal feeder comprising:
   a) a housing;

b) at least one food receptacle coupled to the housing and configured to receive and store food, the food receptacle comprising an inlet opening for receiving food and an outlet opening for releasing food;
c) at least one water reservoir coupled to the housing and configured to receive and store water;
d) at least one supplement receptacle coupled to the housing and configured to receive and store at least one supplement;
e) at least one medication receptacle coupled to the housing and configured to receive and store at least one medication;
f) a food dispensing mechanism coupled to the at least one food receptacle and configured to dispense food from the at least one food receptacle;
g) a water dispensing mechanism coupled to the at least one water reservoir and configured to dispense water from the at least one water reservoir;
h) a supplement dispensing mechanism coupled to the at least one supplement receptacle and configured to dispense supplement from the at least one supplement receptacle;
i) a medication dispensing mechanism coupled to the at least one medication receptacle and configured to dispense medication from the at least one medication receptacle;
j) a control system mounted in the housing and coupled to the food, water, supplement, and medication dispensing mechanisms, the control system configured to control the food, water, supplement and medication dispensing mechanisms so that a desired amount of food, water, supplement and medication are dispensed; and
k) one or more air tight cartridges each containing one or more supplements, wherein the cartridges are configured such that ambient air is not able to contact the supplement contained in the cartridge, preventing the supplement from oxidizing and deteriorating.

2. The animal feeder of claim 1, further comprising a power source and a water heater for heating water contained in the water reservoir to an appropriate temperature for dispensing onto dispensed food.

3. The animal feeder of claim 1, further comprising a power source and wherein the supplement dispensing mechanism comprises an air pump coupled to the at least one supplement receptacle configured to expel supplement contained in the at least one supplement receptacle at a measured rate.

4. The animal feeder of claim 1, further comprising a power source and wherein the supplement dispensing mechanism comprises an air pump coupled to the at least one supplement receptacle configured to expel supplement contained in the one or more cartridges at a measured rate.

5. The animal feeder of claim 1, further comprising a power source and wherein the control system comprises a display coupled to the housing configured to permit a user to create one or more pet profiles assigned to one or more individual pets, each pet profile comprising the desired amount of food, water, supplement and medication to be dispensed when the pet profile is selected by the user.

6. An animal feeder comprising:
a) a housing comprising a base, the base comprising a platform for placement of a food dish;
b) at least one food receptacle coupled to the housing and configured to receive and store food, the food receptacle comprising an inlet opening for receiving food and an outlet opening for releasing food;
c) at least one supplement receptacle coupled to the housing and configured to receive and store at least one supplement;
d) a food dispensing mechanism coupled to the at least one food receptacle and configured to dispense food from the at least one food receptacle;
e) a supplement dispensing mechanism coupled to the at least one supplement receptacle and configured to dispense supplement from the at least one supplement receptacle;
f) a control system coupled to the housing and connected to the food and supplement dispensing mechanisms, the control system configured to control the food and supplement dispensing mechanisms so that a desired amount of food and supplement are dispensed;
g) a power source coupled to the control system and the food and supplement dispensing mechanisms; and
h) at least one air tight cartridge, each cartridge containing one or more supplements, wherein the cartridges are configured such that ambient air is not able to contact the supplement contained in the cartridges, preventing the supplement from oxidizing and deteriorating.

7. The animal feeder of claim 6, further comprising:
h) at least one water reservoir coupled to the housing and configured to receive and store water; and
i) a water dispensing mechanism coupled to the at least one water reservoir and configured to dispense water from the at least one water reservoir.

8. The animal feeder of claim 6, further comprising:
h) at least one medication receptacle coupled to the housing and configured to receive and store at least one medication; and
i) a medication dispensing mechanism coupled to the at least one medication receptacle and configured to dispense medication from the at least one medication receptacle.

9. The animal feeder of claim 6, further comprising a water heater for heating water contained in the water reservoir to an appropriate temperature for dispensing onto dispensed food.

10. The animal feeder of claim 6, wherein the supplement dispensing mechanism comprises an air pump coupled to the at least one supplement receptacle configured to expel supplement contained in the at least one supplement receptacle at a measured rate.

11. The animal feeder of claim 6, wherein the supplement dispensing mechanism comprises an air pump coupled to the at least one supplement receptacle configured to expel supplement contained in the at least one cartridges at a measured rate.

12. The animal feeder of claim 6, wherein the control system comprises a display coupled to the housing configured to permit a user to create one or more pet profiles assigned to one or more individual pets, each pet profile comprising the desired amount of food and supplement to be dispensed when the pet profile is selected by the user.

13. A method of using an animal feeder, the method comprising the steps of:
a) providing the animal feeder of claim 12;
b) creating one or more pet profiles assigned to one or more individual pets using the display;
c) placing an empty food dish on the platform;
d) selecting the desired pet profile on the display; and
e) dispensing a proper amount of food and supplement into the empty food dish.

14. A method of using an animal feeder, the method comprising the steps of:

a) providing the animal feeder of claim 12;
b) placing an empty food dish on the platform;
d) selecting the desired pet profile on the display; and
e) dispensing a proper amount of food, water and supplement into the empty food dish.

\* \* \* \* \*